(No Model.)  2 Sheets—Sheet 1.
J. W. DUNFEE.
ROTARY ENGINE.

No. 317,751. Patented May 12, 1885.

WITNESSES
INVENTOR
James W. Dunfee
By his Attorneys (No Model.) 2 Sheets—Sheet 2.
J. W. DUNFEE.
ROTARY ENGINE.
No. 317,751. Patented May 12, 1885.
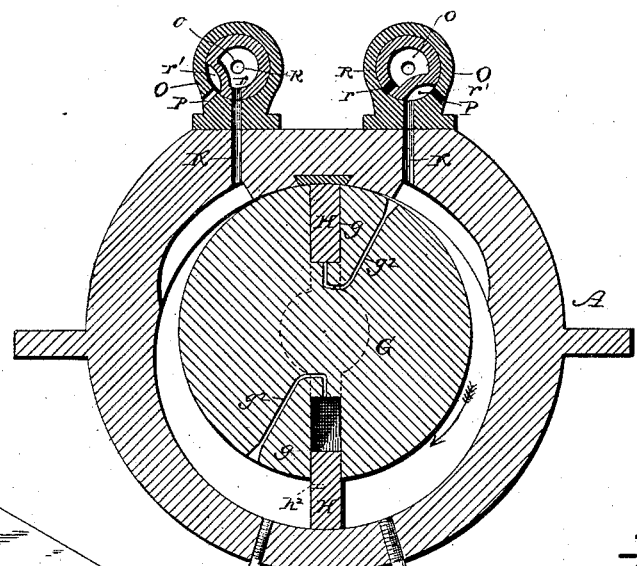
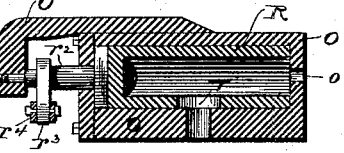
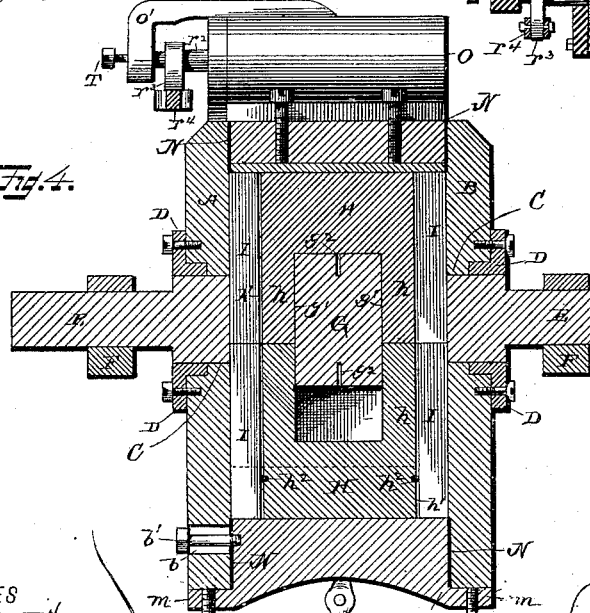
WITNESSES
INVENTOR
By his Attorneys

UNITED STATES PATENT OFFICE.

JAMES W. DUNFEE, OF ROUNDHEAD, OHIO, ASSIGNOR OF ONE-HALF TO JAMES E. MERTZ, OF SAME PLACE.

ROTARY ENGINE.

SPECIFICATION forming part of Letters Patent No. 317,751, dated May 12, 1885.

Application filed March 2, 1885. (No model.)

*To all whom it may concern:*

Be it known that I, JAMES W. DUNFEE, a citizen of the United States, residing at Roundhead, in the county of Hardin and State of Ohio, have invented a new and useful Improvement in Rotary Engines, of which the following is a specification, reference being had to the accompanying drawings.

My invention relates to an improvement in rotary engines; and it consists in the peculiar construction and combination of devices that will be more fully set forth hereinafter, and particularly pointed out in the claims.

Figure 1:
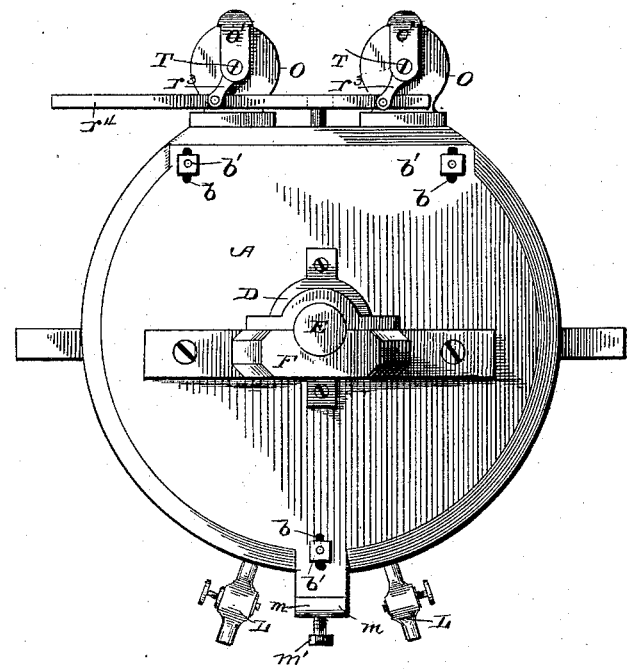
Figure 2:
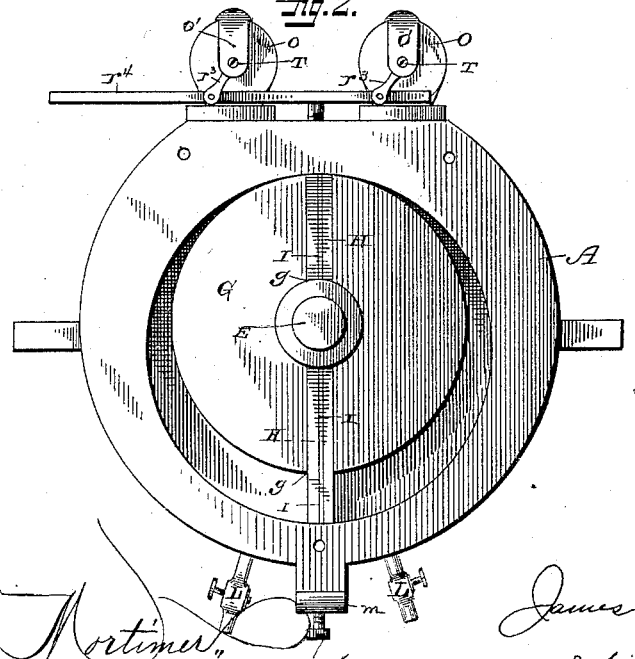

In the accompanying drawings, Figure 1 is an elevation of an engine embodying my invention. Fig. 2 is a similar view with one of the cylinder-heads removed. Fig. 3 is a vertical central longitudinal section. Fig. 4 is a vertical cross-sectional view. Figs. 5 and 6 are detailed views.

A represents the cylinder, and B the cylinder-heads, which are provided with eccentrically-located openings C, in which are located bearing-rings D, which are made of suitable metal.

E represents the driving-shaft, which passes through the cylinder, having its bearings in the rings D. Beyond the rings D the shaft is somewhat reduced, and these reduced ends of the shaft have their bearings in the brackets F, that are bolted to the outer faces of the cylinder-heads.

Formed integrally with the shaft E is the hub G, which is inclosed in the cylinder and extends across the cylinder, bearing against the cylinder-heads and against the upper side of the cylinder, as shown. The hub is provided with transverse grooves $g$ and with diametrically-extending grooves $g'$, that connect the grooves $g$.

Valves H fit in the grooves $g$, and have projecting portions $h$, that enter the grooves $g'$. The ends of these valves are grooved, as at $h'$, and are provided with openings $h^2$, that communicate with the inner ends of the grooves. Bearing-strips I are inserted into the grooves $h'$ and bear against the cylinder-heads.

K represents steam-ports that are located on the upper side of the cylinder on opposite sides of the vertical center thereof.

Blow-off cocks L are located at the lower side of the cylinder, and serve to blow off water that results from the condensation of steam therein.

A yoke, M, is formed with the cylinder, and is located on the lower side thereof, having projecting ends $m$, that extend out under the lower sides of the cylinder-heads. The cylinder-heads are provided with vertical slotted openings $b$, through which the bolts $b'$ pass that secure the cylinder-heads to the cylinder. Bolts $m'$ pass up through the ends of the yoke M and bear against the lower sides of the cylinder-heads. By loosening the bolts $b'$ and tightening the bolts $m'$ the cylinder-heads can be adjusted vertically, so as to cause the hub to bear closely against the upper side of the cylinder at all times.

Packing-rings N are interposed between the cylinder-heads and the ends of the cylinder.

O represents cylindrical valve-seats that communicate with the ports K, and that are provided with exhaust-ports P.

R represents hollow cylindrical turning valves that are open at one end and have the openings $r$ and the recesses $r'$. Through one end of each of the valve-seats is made an opening, $o$, which communicates with the open end of the valve. Stems $r^2$ project from the closed ends of the valve, and against the ends of these stems bear set-screws T, that pass through brackets $o'$, that are formed with the valve-seats. By tightening the screws T the valves are caused to bear tightly against the closed ends of the seats. Arms $r^3$ are secured to the stems $r^2$, and are connected together by a rod, $r^4$.

The operation of my engine is as follows: When the valves are turned in the position indicated in Figs. 1 and 3, the valve to the left is turned, so as to permit the steam which enters the opening $o$ to pass through the port K and enter the cylinder, where it acts against the valves H and rotates the hub G in the direction of the arrow. As the steam reaches the opposite port, K, it passes into the recess $r'$ of the opposite valve and out through the exhaust-port P, with which said recess communicates. When the valves are turned in the opposite direction, the movement of the engine is reversed. In order to cause the valves H to be packed tightly against the cylinder, I make openings $g^2$ in the hub, which communicate with the grooves $g$. Steam enters these openings and bears against the inner edges of the valves H and presses said valves outwardly tightly against the cylinder. Steam also enters the grooves $h'$ through the openings $h^2$, and causes the strips I to bear tightly against the cylinder-heads. By this means the engine is made self-packing, as will be very readily understood.

Having thus described my invention, I claim—

1. The combination of the cylinder, the cylinder-heads having the slots $b$, the bolts $b'$, passing through the slots $b$ and securing the heads to the cylinder, the hub in the cylinder journaled in the cylinder-heads, and the screws $m'$, for adjusting the heads on the cylinder, substantially as described.

2. The combination of the cylindrical valve-seats O, having the brackets $o'$, the openings $o$ in the ends of the valve-seats, and the openings K, communicating with the cylinder, with the cylindrical valves R, located in the valve-seats, said valves having one end open, the openings $r$ and recesses $r'$ and stems $r^2$, and the screws T, in the brackets $o'$, bearing against the valve-stems, substantially as described.

3. The combination of the cylindrical valve-seats O, having the brackets $o'$, the openings $o$ in the ends of the valve-seats, and the openings K, communicating with the cylinder, with the cylindrical valves R, located in the valve-seats, said valves having one end open, the openings $r$ and recesses $r'$, stems $r^2$ and arms $r^3$, the screws T in the brackets bearing against the ends of the valve-stems, and the rod $r^4$, connecting the arms, substantially as described.

In testimony that I claim the foregoing as my own I have hereto affixed my signature in presence of two witnesses.

JAMES W. DUNFEE.

Witnesses:
HENRY SHULTZ,
GEORGE W. WILCOX.